United States Patent
Kulli

(10) Patent No.: US 11,243,712 B2
(45) Date of Patent: Feb. 8, 2022

(54) LOCAL ANALYTICS FOR HIGH-AVAILABILITY STORAGE SYSTEMS

(71) Applicant: Hewlett Packard Enterprise Development LP, Houston, TX (US)

(72) Inventor: Prashant Kulli, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 60 days.

(21) Appl. No.: 16/456,674

(22) Filed: Jun. 28, 2019

(65) Prior Publication Data

US 2020/0409591 A1 Dec. 31, 2020

(51) Int. Cl.
*G06F 3/06* (2006.01)
*G06F 11/30* (2006.01)
(Continued)

(52) U.S. Cl.
CPC .......... *G06F 3/0655* (2013.01); *G06F 3/0604* (2013.01); *G06F 3/0674* (2013.01);
(Continued)

(58) Field of Classification Search
CPC .... G06F 3/0655; G06F 3/0604; G06F 3/0674; G06F 3/0679; G06F 3/0689; G06F 11/3034; G06F 11/3452; G06F 11/2089; G06F 11/0727; G06F 11/0757; G06F 3/0659; G06F 3/0683
See application file for complete search history.

(56) References Cited

U.S. PATENT DOCUMENTS 8,255,915 B1 8/2012 Blanding et al.
9,164,864 B1 10/2015 Novick et al.
(Continued)

FOREIGN PATENT DOCUMENTS

EP 3037964 B1 6/2016

OTHER PUBLICATIONS

Hwang, J-H. et al., "High-availability algorithms for distributed stream processing," 21st International Conference on Data Engineering (ICDE'05), 2005, pp. 779-790, doi: 10.1109/ICDE.2005.72. https://ieeexplore.ieee.org/document/1410192.*
(Continued)

*Primary Examiner* — Masud K Khan
(74) *Attorney, Agent, or Firm* — Sheppard Mullin Richter & Hampton LLP

(57) ABSTRACT

Systems and methods are provided for local analytics for high-availability storage systems. A storage system may include first and second storage controllers to act as active and passive controllers for the storage system, and a plurality of storage devices. A method may include obtaining one or more storage microservices; responsive to determining that the second storage controller is not performing read and write operations on the storage device as the active controller, beginning to perform read and write operations on the storage device as the active controller; and responsive to determining that the second storage controller is performing read and write operations on the storage device as the active controller, executing the one or more storage microservices in the respective virtual computing environments of the storage system.

20 Claims, 5 Drawing Sheets

(51) Int. Cl.
*G06F 11/34* (2006.01)
*G06F 11/20* (2006.01)
*G06F 11/07* (2006.01)

(52) U.S. Cl.
CPC .......... *G06F 3/0679* (2013.01); *G06F 3/0689* (2013.01); *G06F 11/0727* (2013.01); *G06F 11/0757* (2013.01); *G06F 11/2089* (2013.01); *G06F 11/3034* (2013.01); *G06F 11/3452* (2013.01)

(56) References Cited

U.S. PATENT DOCUMENTS

| | | | |
|---|---|---|---|
| 10,719,253 | B2 | 7/2020 | Alkalay et al. |
| 10,922,205 | B2 | 2/2021 | Asawa et al. |
| 2016/0255016 | A1 | 9/2016 | Miller |
| 2018/0018116 | A1* | 1/2018 | Hallisey ................ G06F 3/0607 |
| 2018/0164791 | A1* | 6/2018 | Debes ............... G05B 19/41855 |
| 2019/0245766 | A1* | 8/2019 | Onoue ................ G06F 11/3495 |
| 2020/0034043 | A1* | 1/2020 | Szczepanik ............. G06F 3/067 |

OTHER PUBLICATIONS

Red Hat Inc., "Chapter 7: Failover Services (FOS)," (web Page), retrived online Feb. 21, 2019, https://docs.huihoo.com/redhat/haserver/RHHAS-1.0-Manual/ch-fos.html.*

Scott Shadley, "SDC 2018—Deployment of In-Storage Compute with NVMe Storage at Scale and Capacity," Oct. 24, 2018, Published by SNIAVideo, (video transcription), <https://www.youtube.com/watch?v=8Q2B0DLeHL0>.

Kukreti, V. et al., "High Availability and Automatic Failover in Hadoop," (Web Page), retrieved online Feb. 28, 2019, https://www.3pillarglobal.com/insights/high-availability-and-automatic-failover-in-hadoop.

Martin et al., "Storage Intelligence in SSDs and Standards," 2015, 2015 Storage Developer Conference, <https://www.snia.org/sites/default/files/SDC15_presentations/solid/BillMartin_Storage_Intelligence_SSDs_and_Standards.pdf>.

Scott Shadley, "Deployment of n-Storage Compute," Sep. 2018, 2018 Storage Developer Conference, <https://www.snia.org/sites/default/files/SDC/2018/presentations/NVMe/Shadley_Scott_Deployment_of_In-Storage_Compute.pdf>.

Vaughn Stewart, "Pure Storage 101: Ensuring 100% Performance," Apr. 2, 2014, <https://blog.purestorage.com/pure-storage-101-ensuring-100-performance/>.

Virtuozzo "Installing Parallels Conta ners for Windows on Cluster Nodes," (Web Page), retrieved online Feb. 28, 2019, http://download.swsoft.com/pvc/60/win/docs/en/Parallels%20Containers%20for%20Windows%20Clustering%20Guide/28467.htm.

Flashdba, "All Flash Arrays: Active/Active versus Active/Passive", available online at <https://flashdba.com/2016/10/19/all-flash-arrays-activeactive-versus-activepassive/>, Oct. 19, 2016, 7 pages.

Gaysee, Jerome, "A Comparison of In-Storage Processing Architectures and Technologies", SDC, Sep. 24-27, 2018, 50 pages.

HPE, "HPE Nimble Storage Deployment Considerations for Stand-alone Servers and Failover Clusters on Windows Server 2016", 2018, 27 pages.

HPE, "HPE RMC 6.0: Storage-Integrated Data Protection and Copy Data Management at the Speed of all-Flash", available online at <https://community.hpe.com/t5/Around-the-Storage-Block/HPE-RMC-6-0-Storage-integrated-data-protection-and-copy-data/ba-p/7020216>, Oct. 2, 2018, 11 pages.

Klaus, Jon, "Nimble Storage—InfoSight VMVision", Fast Storage, HPE, available online at <https://faststorage.eu/nimble-storage-infosight-vmvision/>, Feb. 22, 2016, 2 pages.

NGD Systems,Inc, "NGD Systems Computational Storage Devices Now Support Containers for Flexible Application Deployment", available online at <https://www.ngdsystems.com/page/NGD-Systems-Computational-Storage-Devices-Now-Support-Containers-for-Flexible-Application-Deployment>, May 23, 2012, 3 pages.

Sanity Solution Inc., "Active/Active Clustering 101", available online at <https://www.sanitysolutions.com/active-clustering-101/>, Jul. 24, 2017, 8 pages.

Snia, "Computational Storage Architecture and Programming Model", Version 0.5 Revision 1, Aug. 6, 2020, pp. 1-66.

* cited by examiner

LOCAL ANALYTICS FOR HIGH-AVAILABILITY STORAGE SYSTEMS

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

High-availability storage systems, such as storage arrays, include a plurality of storage devices and a plurality of storage controllers. In some examples, one of the storage controllers may operate as an "active" controller that performs read and write operations on the storage devices (e.g., based on read and write requests from a client device separate from the storage system), and the other storage controller may operate as a "passive" controller that does not perform read and write operations on the storage devices and may generally be idle except for monitoring the status of the active controller. When the active controller fails, the passive controller may become the active controller, and begin performing read and write operations on the storage devices.

The passive controller remains powered on but idle, aside from monitoring the health of the active controller. That is, the resources of the passive controller, for example such as the CPU and RAM, are largely unused. Embodiments of the present disclosure put the idle resources of the passive controller to good use. In particular, the passive controller locally performs storage system management functions that may otherwise be performed remotely by, for example, cloud-based systems. The passive controller downloads containerized microservices that implement the storage system management functions, and executes those functions locally in respective virtual computing environments. Being executed locally, these functions provide alerts, reports, and the like on a much more timely basis than remote systems, and with greatly reduced support costs.

Embodiments of the disclosed technology are described in terms of storage devices and storage controllers. However, the disclosed technology can be applied to other types of high-availability systems with an active/standby architectures. For example, the disclosed technology can be applied to high-availability Cluster Software systems where an active node/host/controller manages an application while the other node(s) wait as standby in case anything goes wrong with the active node.

Figure 1:
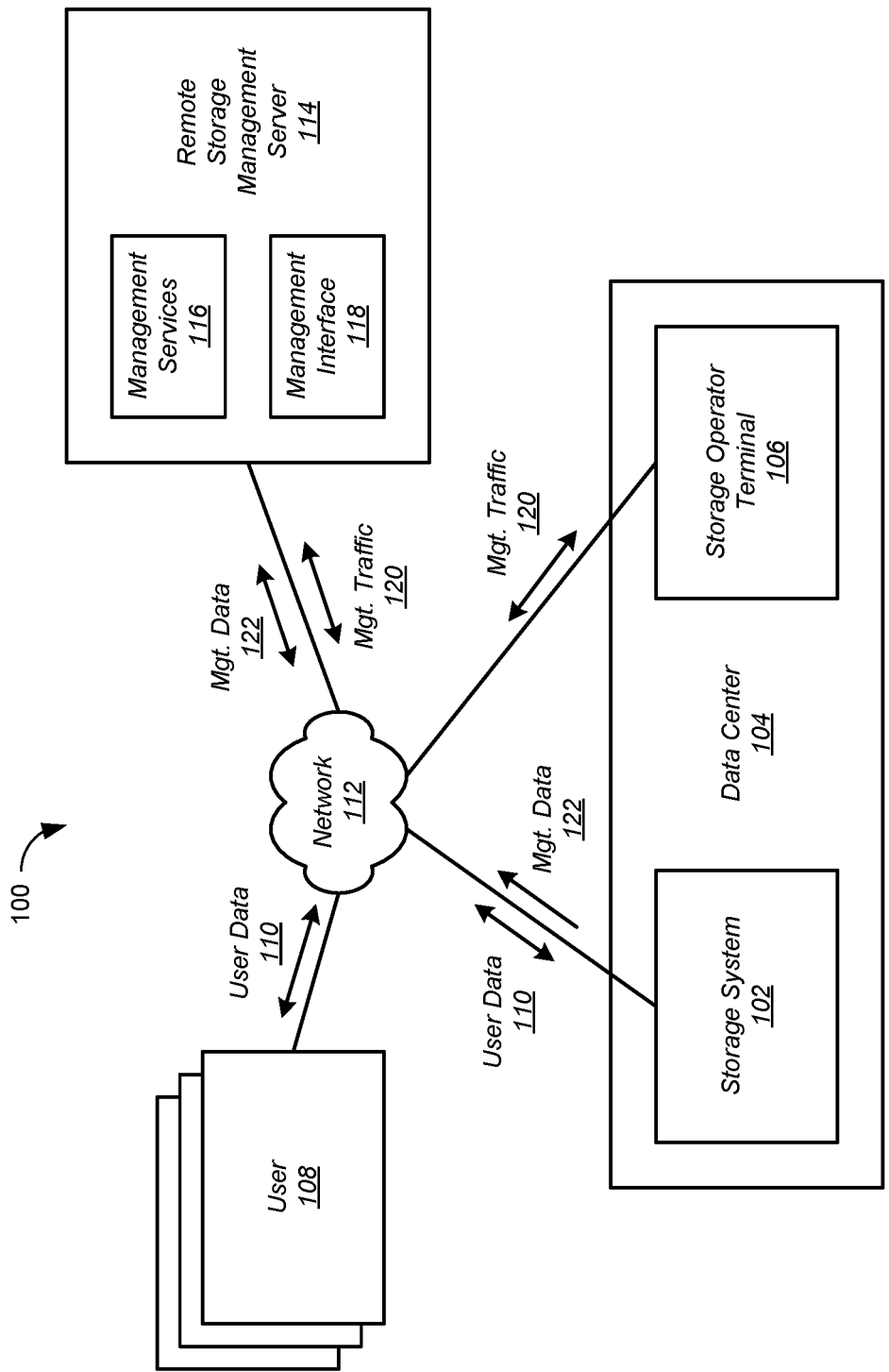
FIG. 1 illustrates an example remote storage management system Referring to FIG. 1, the storage system may be implemented within a data center.

FIG. 1 illustrates an example remote storage management system 100. Referring to FIG. 1, the storage system 102 may be implemented within a data center 104. Remote users 108 exchange user data 110 with the storage system 102 over a network 112 such as the Internet.

The data center 104 may include a storage operator terminal 106. A storage operator may employ the storage operator terminal 106 to manage the storage system 102.

The remote storage management system 100 may include a remote storage management server 114. The remote storage management server 114 may include management services 116 that perform storage management functions for the storage system 102 based on storage management data 122 obtained from the storage system 102. The storage management data 122 may include storage system logs, storage statistics, and the like.

The remote storage management server may include a management interface 118. The management interface 118 may exchange management traffic 120 with the storage operator terminal 106 at the data center 104. The management traffic 120 may include reports, alerts, and the like generated by the storage management services 116. A storage operator at the data center 104 may access this management traffic 120 using the storage operator terminal 106.

Remote systems such as the remote storage management system 100 of FIG. 1 present several challenges. For example, such remote systems may not operate upon a real-time model. In general, management data 122 may be transferred from storage system 102 to the remote storage management server 114 only once a day. Therefore, there may be a considerable delay between occurrence of a storage system failure and the generation of a corresponding alert for the storage operator. In many cases, storage system outages could be prevented by reducing such delays. Remote systems may also represent a single point of failure. Failure of such a remote system may adversely affect all of the storage systems managed by that remote system.

These challenges are answered by the disclosed technology. Being disposed locally, within the storage systems, the disclosed technology provides real-time storage analytics and alerts. In some embodiments, the disclosed technology also provides real-time self-healing in response to failures. Systems implemented according to the disclosed technology may reduce issues relating to having a single point of failure. A failure at a local storage device may be limited to that local storage device, while other storage devices are unaffected.

Figure 2:
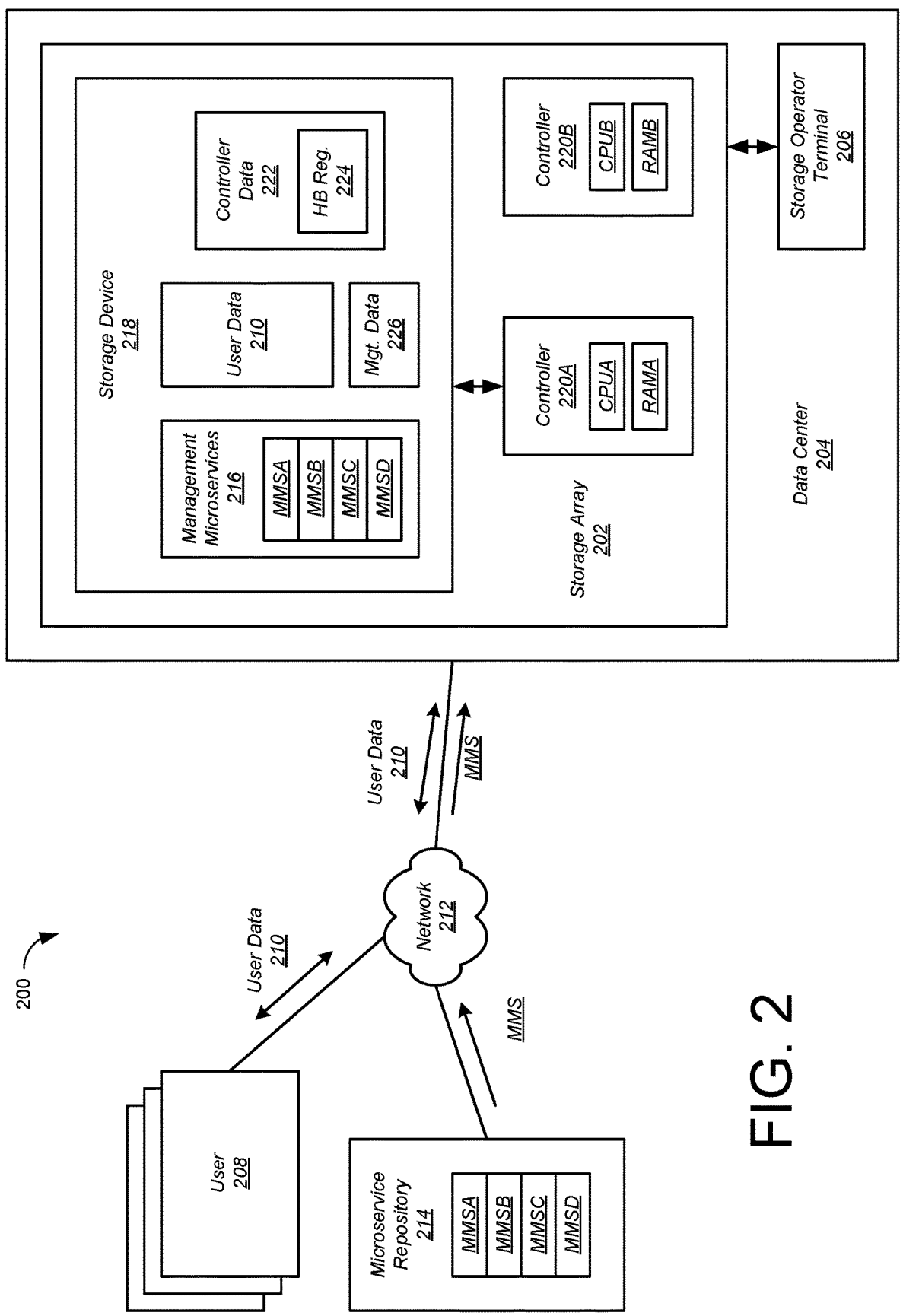
FIG. 2 illustrates a storage management system according to embodiments of the disclosed technology.

FIG. 2 illustrates a storage management system 200 according to embodiments of the disclosed technology. Referring to FIG. 2, the system 200 may include one or more storage arrays 202. Each storage array 202 may include a plurality of storage devices 218, and a plurality of controllers 220A, B. Each controller 220 may include a CPU and RAM. Referring to FIG. 2, controller 220A may include a CPU referred to as "CPUA" and RAM referred to as "RAMA", while controller 220B may include a CPU referred to as "CPUB" and RAM referred to as "RAMB." In examples described herein, a "storage device" may be implemented by a hard disk drive (HDD), a solid state drive (SSD) (e.g., a flash drive), or any other persistent storage technology. For example, the storage devices 218 may comprise HDDs, SSDs, or the like, or a combination thereof, and may be implemented as a RAID array of such storage devices.

Each storage device 218 may store several types of data. The data may include user data 210 provided by users 208. The user data 210 may include files, applications, and the like. The data may include controller data 222 for use by the controllers 220.

In some embodiments, the controller data 222 may include a heartbeat (HB) register 224. During operation, the active controller may write to the heartbeat register 224 at regular intervals, for example once a second. The passive controller may monitor the heartbeat register 224. When the passive controller determines that the active controller has not written to the heartbeat register 224 recently, the passive controller may become the active controller that performs read and write operations on the storage devices.

The data stored by the storage devices 218 may include management data 236. The storage management data 236 may include storage system logs, storage statistics, configuration information for the storage array 202, and the like.

In the described embodiments, the storage array 202 stores one or more management microservices 216. In the example of FIG. 2, these management microservices 216 may be stored in the storage devices 218. However, some or all of the microservices 216 may be loaded in the RAM of the passive controller 220. In the example of FIG. 2, four microservices 216 are shown: a first management microservice (MMS), referred to as "MMSA", a second management microservice referred to as "MMSB", a third management microservice referred to as "MMSC", and a fourth management microservice referred to as "MMSD". However, it will be appreciated that more or fewer microservices 216 may be employed.

In some embodiments, one or more of the microservices 216 may be provisioned with the storage devices 218, that is, stored in the storage devices prior to operation. In some embodiments, one or more of the microservices may be downloaded from a remote microservice repository 214 over a network 212 such as the Internet. These downloading microservices are shown at MMS in FIG. 2. This arrangement allows the provider of the microservices 216 to provide updates to the microservices 216 on a timely basis. For example, the passive controller of the storage array 202 may provide a regular heartbeat signal to the microservice repository 214. When an updated microservice 216 is available, the microservice repository 214 may inform the passive controller of the updated micro service 216 responsive to receiving the heartbeat signal. The passive controller may then download the updated microservice 216.

Figure 3:
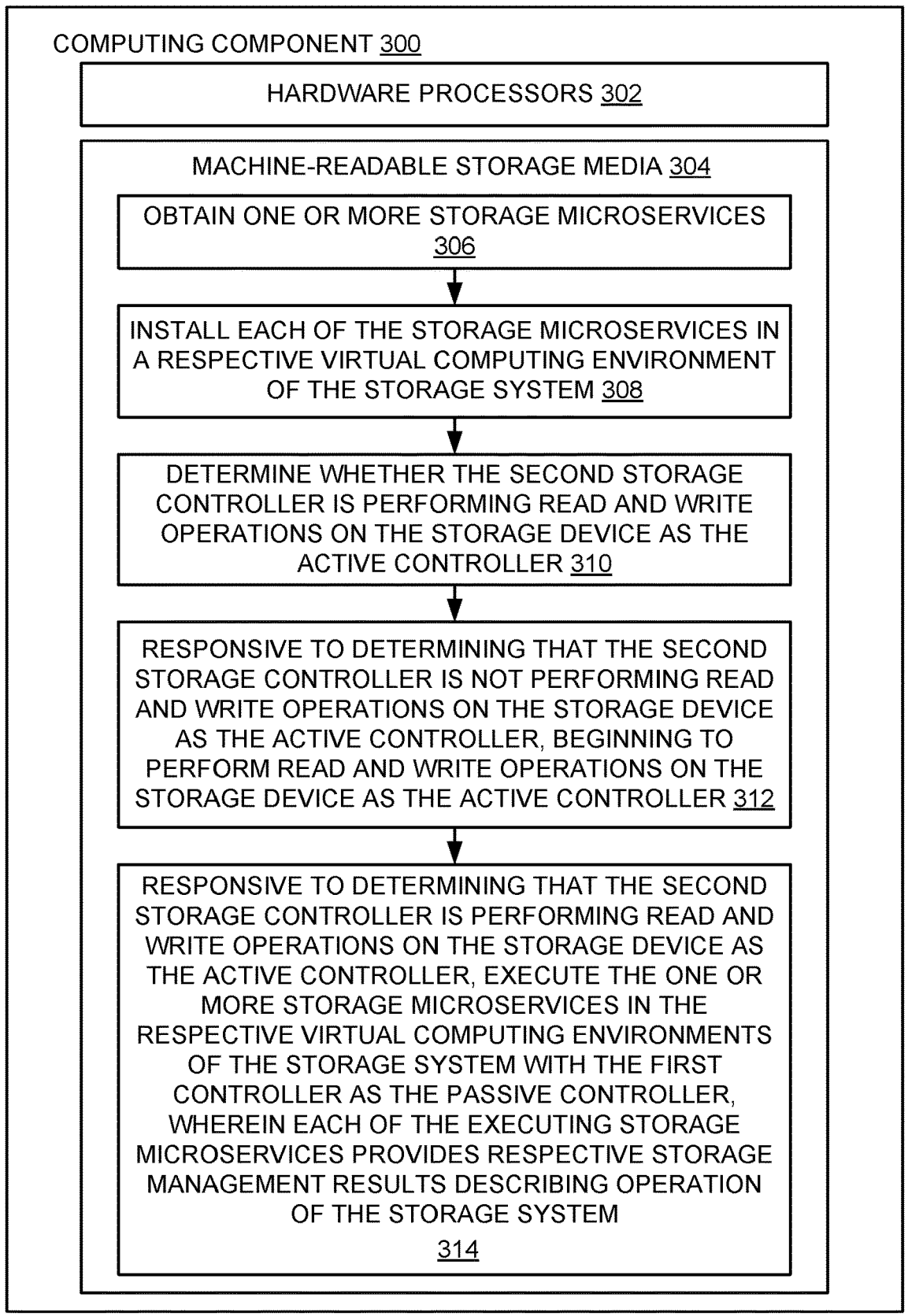
FIG. 3 is a block diagram of an example computing component or device in accordance with one embodiment of the disclosure.

FIG. 3 is a block diagram of an example computing component or device 300 in accordance with one embodiment of the disclosure. Computing component 300 may be, for example, a storage array, a server computer, a controller (e.g., of a storage array), or any other similar computing component capable of processing data. In the example implementation of FIG. 3, the computing component 300 includes at least one hardware processor 302, and machine-readable storage medium 304.

In some embodiments, computing component 300 may be an embodiment of one or more of the controllers 220 of the storage array 202 of FIG. 2, a controller of the microservice repository 214 of FIG. 2, or any combination thereof.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-314, to control processes or operations for performing local analytics for high-availability storage systems. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-314. Depending on the implementation, the instructions 306-314 may include additional, fewer, or alternative instructions performed in various orders or in parallel.

The example of FIG. 3 is described with reference to the components of the storage management system 200 of FIG. 2. In this example, the instructions 306-314 may be performed by one controller 220A of the storage array 202, which may be referred to as "the first controller," while "the second controller" may refer to the controller 220B of the storage array 202. However, it will be understood that the functions described herein may be performed by either controller 220 at various times.

Hardware processor 302 may execute instructions 306 to perform obtaining one or more storage microservices 216. For example, the first controller 220A may download the microservices 216 from the remote microservice repository 214. Updates to the storage microservices 216 may be obtained in a similar manner. Each microservice 216 may be downloaded as a container image. The container images may contain appropriate programs and frameworks to run analytics on the management data 236 at any time. For example, the programs may include Python, GNU Debugger (GDB), other database analysis tools, and the like. The container images may be downloaded proactively, at regular intervals according to an update schedule, and the like.

Figure 4:
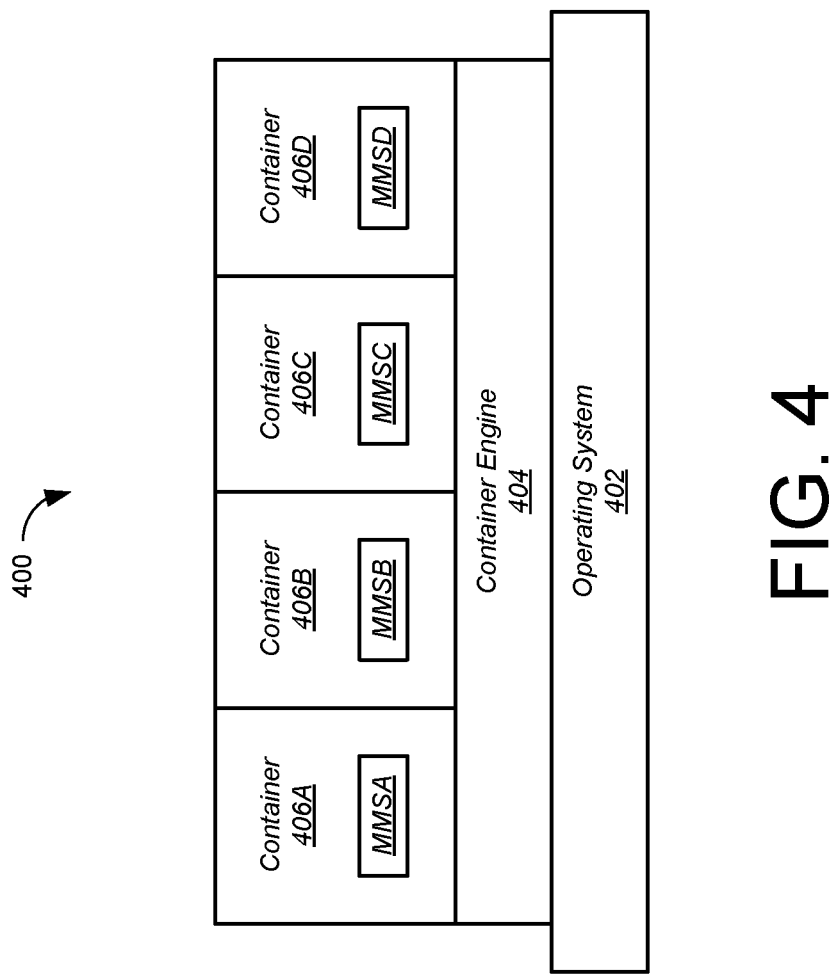
FIG. 4 illustrates the container architecture according to one embodiment of the disclosed technology.

Hardware processor 302 may execute instructions 308 to perform installing each of the storage microservices 216 in a respective virtual computing environment of the storage array 202. For example, the first controller 220A may install the storage microservices 216 as containers in communication with a container engine. The container engine is a process that is executable by a CPU to run and manage the containers. FIG. 4 illustrates a container architecture 400 according to one embodiment of the disclosed technology.

Referring to FIG. 4, the architecture 400 includes an operating system 402. For example, the operating system 402 may be a Linux operating system or the like. A container engine 404 is installed in the operating system 402. For example, the container engine 404 may be a Docker engine. Each microservice may be installed as a separate container 406. For example, referring to FIG. 4, the microservices MMSA, MMSB, MMSC, and MMSD may be installed as containers 406A, B, C, D, respectively. Each container may be installed by storing an image of that container in a memory.

Returning to the example above in which computing component 300 is implemented by controller 220A, hardware processor 302 may execute instructions 310 to determine whether the second storage controller 220B is performing read and write operations on the storage devices 218 of the storage system 202 as the active controller. As described above, this determination may be made using the heartbeat register 224 within controller data 222 stored in the storage devices 218 of the storage array 202.

Hardware processor 302 may execute instructions 312 to perform, responsive to determining that the second storage controller 220B is not performing read and write operations on the storage devices 218, performing read and write operations on the storage devices 218 as the active controller. For example, when the first storage controller 220A is the passive controller, and determines that the active second storage controller 220B has failed, the first storage controller 220A becomes the active controller, and the second storage controller 220B becomes the passive controller. As the active controller, the first storage controller 220A performs read and write operations on the storage devices 218. As the passive controller, the second storage controller 220B does not perform read and write operations on the storage devices 218.

Hardware processor 302 may execute instructions 314 to perform, responsive to determining that the second storage controller is performing read and write operations on the storage device as the active controller, executing the one or more storage microservices 216 in the respective virtual computing environments of the storage system with the first controller as the passive controller, wherein each of the executing storage microservices provides respective storage management results describing operation of the storage system. For example, when the first storage controller 220A is the passive controller, and determines that the active second storage controller 220B has not failed, the first storage controller 220A remains the passive controller, and may execute one or more of the storage management microservices 216 in its virtual computing environment.

In some embodiments, the passive controller executing a storage microservice 216 in a virtual computing environment of the storage system 200 may include executing a container engine 404. Each of the storage microservices 216 may be contained within a respective container 406. The container engine 404 may execute the containers 406. Each container 406 may be an image that contains appropriate programs and frameworks to execute one or more of the storage microservices. In some embodiments, the storage devices 218 store one or more status files that describe a status of the storage devices 218, and executing a storage microservice 216 may include analyzing the one or more status files. In some embodiments, the storage management results may indicate a fault in the storage devices 218, and reporting the storage management results to the storage operator may include generating an alert for the storage operator.

The microservices 216 may implement any storage management functions. For example, the microservices 216 may include tools such as log analyzers, performance analyzers, hardware analyzers, service monitors, and the like. Some microservice examples are now described. However, it will be appreciated that any storage management microservices may be implemented in a similar manner. The microservices 216 may run continuously, occasionally, on demand, or the like. The microservices may perform predictive analytics for the storage devices 218 to flag software defects in the present or expected to occur in the future.

In a first example, a microservice 216 when executed runs backtrace matching signatures in the event of unexpected service restart on the storage devices 218 (that is, a restart of the services). The container 406 that runs on the passive controller may have shared access to the core file, or the core file may be made available to the standby controller for processing. A core file is an image of a running program in the operating system. Any time a process or a program crashes unexpectedly, a core file may be generated as an image of the program at the time of the crash. The core file may be used later for postmortem analysis to identify the root cause of unexpected crash. The container 406 may have the appropriate image for core file processing. That is, the container image may contain a GNU debugger with appropriate signatures. Whenever signatures are created, the container images in the microservice repository 214 may be updated, and the controllers 220 may be notified that newer signatures are available. As soon as a service restart occurs, the passive controller may quickly match the event to a known signature, and may provide bug details with appropriate fixes and workarounds. If this is a new signature, a new case may be created and a new signature may be updated in the repository.

In a second example, a severe performance issue reported by a customer may require per-second statistics. In this example, a tiny container on the passive controller may run analytics on per-second statistics that are available for the previous 2 hours on the storage devices 218. This container may provide its own interface for debugging, using all the available compute resources on the passive controller, while the active controller is serving users 208.

Figure 5:
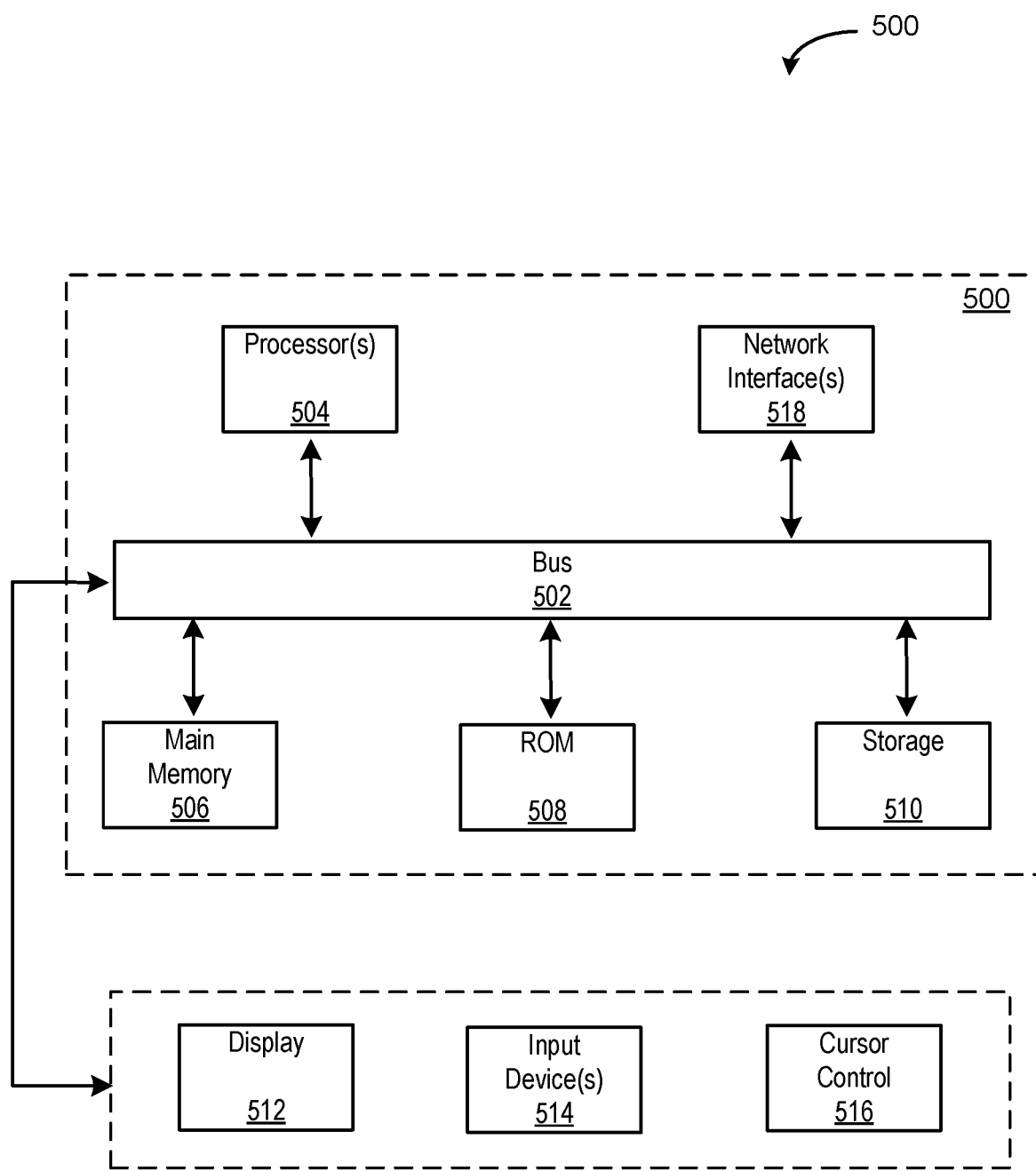
FIG. 5 depicts a block diagram of an example computer system in which embodiments described herein may be implemented.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A storage system, comprising:
   first and second storage controllers, the first storage controller comprising a hardware processor;
   a plurality of storage devices; and
   a non-transitory machine-readable storage medium encoded with instructions executable by the hardware processor of the first storage controller to:
   obtain one or more storage microservices;
   install each of the storage microservices in a respective virtual computing environment of the storage system;
   determine whether the second storage controller is performing read and write operations on the storage devices;
   responsive to determining that the second storage controller is not performing read and write operations on the storage devices, begin to perform read and write operations on the storage devices with the first controller; and
   responsive to determining that the second storage controller is performing read and write operations on the storage devices, execute the one or more storage microservices in the respective virtual computing environments of the storage system with the first storage controller operating as a controller that does not perform read and write operations on the storage devices, wherein each of the executing storage microservices provides respective storage management results describing operation of the storage system, and wherein execution of the one or more storage microservices comprises analyzing one or more status files that describe a status of the storage devices.

2. The system of claim 1, wherein the instructions to obtain the one or more storage microservices comprise instructions to:
   download the one or more storage microservices from a remote repository of the storage microservices.

3. The system of claim 1, wherein the instructions to execute the one or more storage microservices in the respective virtual computing environments of the storage system comprise instructions to:
   execute a container engine, wherein each of the storage microservices is contained within a respective container, and wherein the container engine executes the containers.

4. The system of claim 1, wherein:
   the storage devices store the one or more status files.

5. The system of claim 1, wherein the instructions to determine whether the second storage controller is performing read and write operations on the storage devices comprise instructions to:
   monitor a heartbeat register in the storage devices.

6. The system of claim 1, wherein the instructions are further executable by the hardware processor of the first storage controller to:
   provide a heartbeat signal to a remote repository;
   receive a notification from the remote repository, responsive to the heartbeat signal, that an updated one of the storage microservices is available; and
   responsive to receiving the notification, download the updated one of the storage microservices from the remote repository, install the updated one of the storage microservices in a respective virtual computing environment of the storage system, and execute the updated one of the storage microservices.

7. The system of claim 1 wherein:
   the storage management results indicate a fault in the storage devices, and
   execution of the one or more storage microservices comprises reporting the storage management results to the storage operator.

8. The storage system of claim 1, wherein:
   the instructions to determine comprise instructions to determine whether the second storage controller is performing read and write operations on the storage devices as an active controller; and
   the instructions to execute comprise instructions to:
   execute the one or more storage microservices with the first storage controller operating as a passive controller, responsive to determining that the second storage controller is performing read and write operations on the storage devices as the active controller.

9. A non-transitory machine-readable storage medium in a storage system including a plurality of storage devices, and including first and second storage controllers, the medium encoded with instructions executable by a hardware processor of the first storage controller to:
   obtain one or more storage microservices;
   install each of the storage microservices in a respective virtual computing environment of the storage system,
   determine whether the second storage controller is performing read and write operations on the storage devices;
   responsive to determining that the second storage controller is not performing read and write operations on the storage devices, begin to perform read and write operations on the storage devices with the first controller; and
   responsive to determining that the second storage controller is performing read and write operations on the storage devices, execute the one or more storage microservices in the respective virtual computing environments of the storage system with the first storage controller operating as a controller that does not perform read and write operations on the storage devices, wherein each of the executing storage microservices provides respective storage management results describing operation of the storage system, and wherein execution of the one or more storage microservices comprises analyzing one or more status foes that describe a status of the storage devices.

10. The medium of claim 9, wherein the instructions to execute the one or more storage microservices in the respective virtual computing environments of the storage system comprise instructions to:
   execute a container engine, wherein each of the storage microservices is contained within a respective container, and wherein the container engine executes the containers.

11. The medium of claim 9, wherein:
   the storage devices store the one or more status files.

12. The medium of claim 9, wherein the instructions to determine whether the second storage controller is performing read and write operations on the storage devices comprise instructions to:
   monitor a heartbeat register in the storage devices.

13. The medium of claim 9, wherein the instructions are executable by the hardware processor of the first storage controller to:
   provide a heartbeat signal to a remote repository;
   receive a notification from the remote repository, responsive to the heartbeat signal, that an updated one of the storage microservices is available; and
   responsive to receiving the notification, download the updated one of the storage microservices from the remote repository, install the updated one of the storage microservices in a respective virtual computing environment of the storage system, and execute the updated one of the storage microservices.

14. The medium of claim 9, wherein:
   the instructions to determine comprise instructions to determine whether the second storage controller is performing read and write operations on the storage devices as an active controller; and
   the instructions to execute comprise instructions to:
      execute the one or more storage microservices with the first storage controller operating as a passive controller, responsive to determining that the second storage controller is performing read and write operations on the storage devices as the active controller.

15. A method for a storage system, the storage system comprising a plurality of storage devices, and first and second storage controllers, the method comprising:
   obtaining one or more storage microservices;
   installing each of the storage microservices in a respective virtual computing environment of the storage system;
   determining whether the second storage controller is performing read and write operations on the storage devices;
   responsive to determining that the second storage controller is not performing read and write operations on the storage devices, begin performing read and write operations on the storage devices, and responsive to determining that the second storage controller is performing read and write operations on the storage devices, executing the one or more storage microservices in the respective virtual computing environments of the storage system with the first storage controller as a controller that does not perform read and write operations on the storage devices, wherein each of the executing storage microservices provides respective storage management results describing operation of the storage system, and wherein executing the one or more storage microservices comprises analyzing one or more status files that describe a status of the storage devices.

16. The method of claim 15, wherein executing the one or more storage microservices in the respective virtual computing environments of the storage system comprises:
   executing a container engine, wherein each of the storage microservices is contained within a respective container, and wherein the container engine executes the containers.

17. The method of claim 15, wherein:
   the storage devices store the one or more status files.

18. The method of claim 15, wherein determining whether the second storage controller is performing read and write operations on the storage devices comprises:
   monitoring a heartbeat register in the storage devices.

19. The method of claim 15, further comprising:
   providing a heartbeat signal to a remote repository;
   receiving a notification from the remote repository; responsive to the heartbeat signal, that an updated one of the storage microservices is available; and
   responsive to receiving the notification, downloading the updated one of the storage microservices from the remote repository, installing the updated one of the storage microservices in a respective virtual computing environment of the storage system, and executing the updated one of the storage microservices.

20. The method of claim 15, wherein:
   determining whether the second storage controller is performing read and write operations on the storage devices comprises:
   determining whether the second storage controller is performing read and write operations on the storage devices as an active controller; and
   the method comprises:
   responsive to determining that the second storage controller is performing read and write operations on the storage devices as the active controller:
      executing the one or more storage microservices with the first storage controller operating as a passive controller.

* * * * *